Feb. 7, 1950         A. ARNASON         2,496,614
ELLIPSOGRAPH
Filed Jan. 31, 1945         2 Sheets-Sheet 1
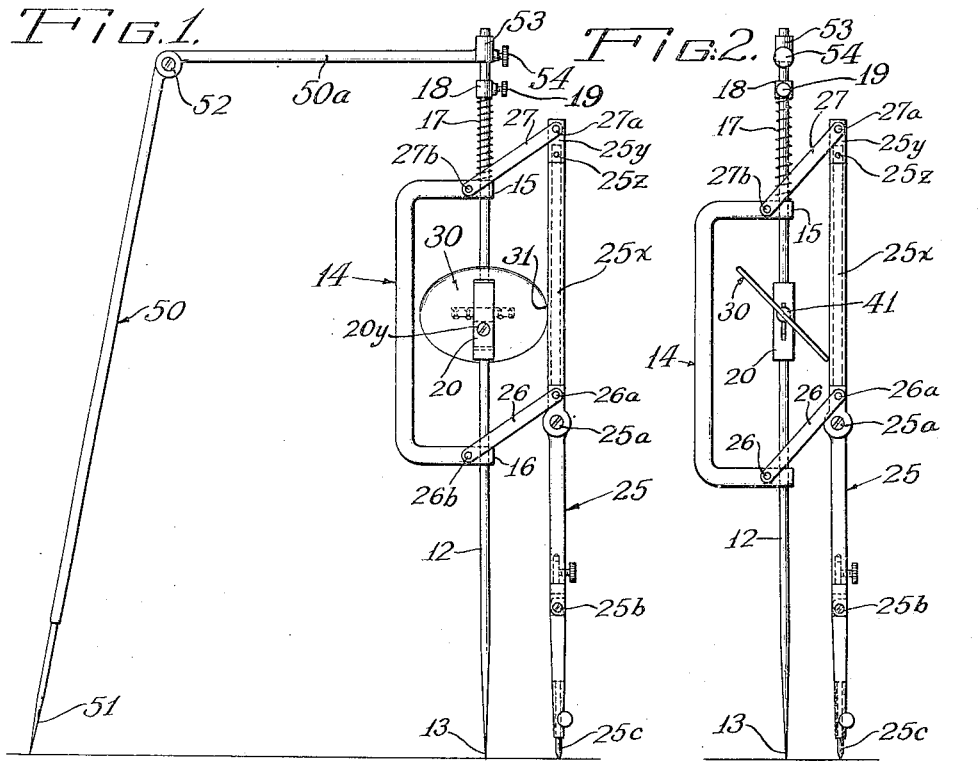
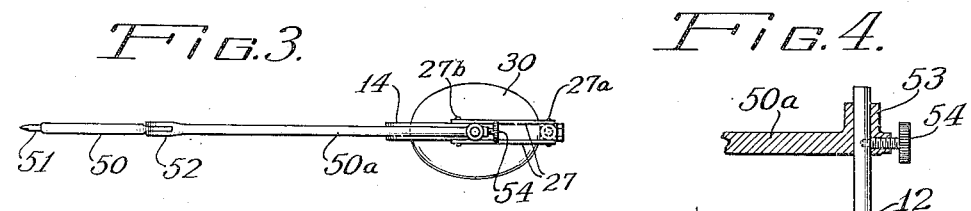
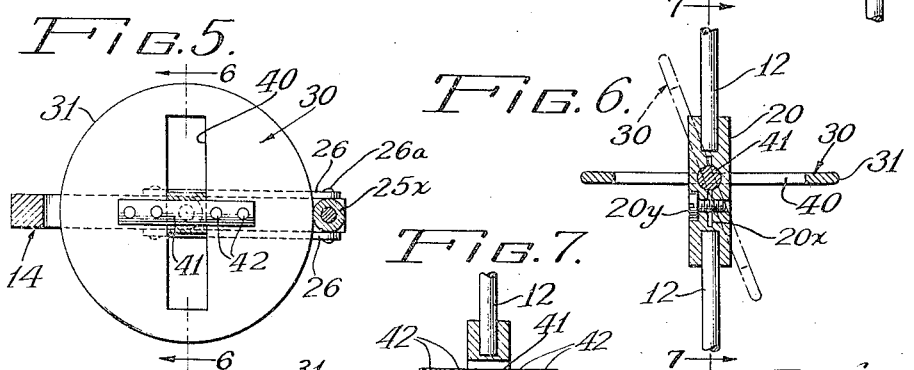
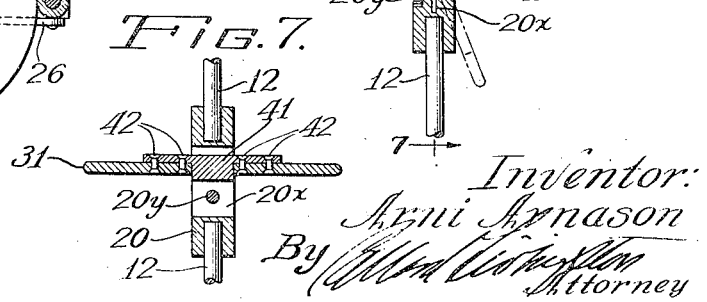
Inventor:
Arni Arnason
By [signature]
   Attorney Feb. 7, 1950 A. ARNASON 2,496,614
ELLIPSOGRAPH
Filed Jan. 31, 1945 2 Sheets-Sheet 2

Inventor:
Arni Arnason
By
Attorney

Patented Feb. 7, 1950

2,496,614

UNITED STATES PATENT OFFICE 2,496,614

ELLIPSOGRAPH

Arni Arnason, Park Ridge, Ill.

Application January 31, 1945, Serial No. 575,489

4 Claims. (Cl. 33—27)

This invention pertains to drawing instruments, and has as its principal object the provision of a device for drawing curves, particularly closed curves, such as the ellipse, which cannot be drawn with the ordinary compass at a single setting or manipulation of the latter.

It is a further object of the invention to provide an instrument of the class described which closely resembles, in adjustment and use, the ordinary compass, and which is capable of delineating closed or open curves of constant radius, such a circle or arc thereof, curves of varying radius or eccentric derivation, like the elliptical curves, as well as curves of irregular properties of predetermined pattern.

Viewed from another aspect, it is an object to provide an instrument for delineating curves, which consists of a relatively stationary leg, relatively movable leg or radius member adapted to be displaced in a rotative sense about the stationary leg, and a template or guide element on one or the other of the legs, and which serves to determine the radial adjustment of the relatively movable leg during rotative displacements of the latter; moreover, it is also an object to make the template or guide element adjustable in certain respects, as well as removable for selective interchange of such elements, in order that the curve pattern may be varied.

Additional and more detailed aspects of novelty and utility relate to particulars of construction and operation of the illustrative embodiment of the device described hereinafter in view of the annexed drawing in which:

Fig. 1 is an elevational view of the novel instrument in position for use;

Fig. 2 is an elevational view displaced 90° anticlockwise from that of Fig. 1, to which displacement or position the movable or tracing element of the instrument has been turned;

Fig. 3 is a top plan view looking down on Fig. 1;

Fig. 4 is a sectional fragment, to enlarged scale of part of the stabilizing leg;

Fig. 5 is a top plan view, to enlarged scale, of the template or guide element, with associated parts shown in section;

Fig. 6 is a vertical section looking in the direction of lines 6—6 of Fig. 5;

Fig. 7 is a vertical section looking in the direction of lines 7—7 of Fig. 6;

Figure 8:
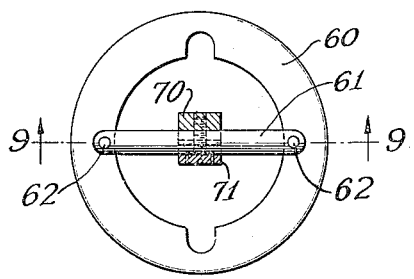
Fig. 8 is a top plan view, partly in section of a modified form of template or guide means.

Referring to Fig. 1, the illustrative form of the instrument consists of a relatively stationary centering member or leg 12, pointed at its lower end 13 for fixation at a desired place on a sheet of drawing paper or the like.

Mounted for rotation on and about the leg 12 is a movable or carrier element in the form of a yoke 14, having aligned openings adjacent the extremities of the yoke arms, 15 and 16, through which the leg element 12 projects.

A coil spring 17 is fitted freely upon the upper portion of leg 12 and exerts an expansive effort between a stop collar 18, adjustably fixed, as by set screw 19, on leg 12, and the upper arm 15 of the yoke, such that the latter is normally urged in a downward direction, slidably, on leg 12, such downward movement being limited by the engagement, under certain conditions, of yoke portion 15 with a trunnion block 20 fast on leg 12; the purpose of this block will appear hereinafter.

A relatively movable leg 25, constituting a radius and scribing or tracing member, is movably attached to the carrier or yoke 14 by a pair of parallel arms 26 and 27, each respectively secured at its end regions by pivot means 26a, 26b, and 27a, 27b to the end portions 16 and 15 of the yoke, and to spaced apart points (preferably the upper end and a median part) of the movable or radius leg. Thus, the movable leg is mounted for at least two degrees of motion: rotative, about the fixed or stationary leg as a center or reference point; and linear in parallelism with the stationary leg, which latter motion, by reason of the parallel arm attachment 26—27, resolves into a radial displacement with respect to the stationary leg.

Movable member or leg 25 is jointed at 25a and 25b, for example, and carries a tracing or pencil element 25c at its lower end, as in the construction of the conventional draughtsman's compass.

Assuming that the spring means 17 is normally urging the yoke or carrier 14 to its lowermost position, in which condition the pencil element 25c would be lowered considerably downward beyond the level of the pointed end 13 of the stationary leg, it will be seen that the movable leg 25 must shift upwardly when the instrument is placed on the paper drawing surface, if the anchoring point 13 and pencil point 25c are to rest in the same plane, as in Fig. 1; and it is the upward displacement of the yoke 14, against spring 17, plus the upward displacement of the leg 25 permitted by parallel arms 26 and 27, which makes this adjustment possible as pencil point 25c bears against the paper.

The aforesaid adjusting movement of the movable leg 25, when the instrument is placed on the drawing paper, is, in effect, and resultantly, a radial adjustment of this movable leg element, which is limited by a pattern controlling or guide means in the form of a template 30, having an edge portion 31 against which bears a roller sleeve 25X on leg 25; this sleeve is stopped at its lower end by a shoulder formation on the leg proper, and at its upper end by a cap element 25Y which is pinned at 25Z to the leg proper. Thus, the sleeve portion 25X is free to rotate in bearing against the template edge portion 31, as for instance, when the movable leg is rotated about the stationary leg 12.

Since the spring means 17 is constantly urging the yoke or carrier 14 downwardly, in the condition of Fig. 1, and since there is a constant upward pressure, in a manner of speaking, against pencil point 25c, the resultant composition of forces urges the sleeve roller 25X against the edge of the template in such manner, that if the carrier or yoke 14 be manually rotated about leg 12, leg 25 will describe a curve depending upon the shape and adjustment of the template 30; for example, if the latter be circular in shape, as shown in Figs. 1 and 5, then leg 25 will describe a circle, provided the template is adjusted to lie in a horizontal plane, that is, parallel with the paper surface on which the pencil point 25c travels, to which surface the stationary leg 12 is held substantially normal by the draughtsman.

The construction and mounting of the template or guide means 30 is such that it may be adjusted to positions out of the plane, as just described, and to this end, as shown in Fig. 5, the template 30 is of circular form with a wide diametric slot 40 extending close to the periphery thereof. Extending transversely of the slot, in the middle of the disc shaped template, is a pivot bar 41 of cylindrical shape in the middle, and relieved at opposite ends to fit against the template disc, to which the bar is attached by means such as rivets 42.

As viewed in Fig. 6, the trunnion or pivot block 20 is pierced to receive the middle cylindrical part of the pivot bar 41 so that the latter, and its attached template may rock, as indicated in the dotted-line displacement of the template. Block 20 is slotted as at 20X, and has threaded across the slot a tension screw 20Y which may be turned up or loosened to set or free the template for rocking motion, so that the template may assume any position from horizontal (which would result in the scribing of a circle by the compass part of the instrument) to an angular position such as shown in Figs. 2 and 6 (which would result in the scribing of an oblate form analogous to the shape of the template 30 as it is viewed in Fig. 3, for example).

In the use of this instrument, it is desirable to maintain the stationary leg part 12 as steady and straight as possible, and to this end there is provided a stabilizing member or leg 50 (Fig. 1) consisting of a section pointed at 51 for engagement in the draughting paper, and jointed, as at 52 to a horizontal section 50a, which terminates in a sleeve portion 53 fitting onto the upper end of the stationary leg means 12. A set screw 54 (Fig. 4) is turned up to hold the arm 50a in fixed relation to leg 12.

The draftsman usually grasps the arm 50a, locates the point 13, and then sets the point 51 conveniently, so that the members 12, 50, 50a are held steady, whereupon yoke 14, and particularly arm portion 15 thereof, may be rotated to cause leg 25 to move above leg 12 at a radial distance from the latter determined by the setting and shape of the guide means or template 30. If this template were positioned as in Figs. 1 and 2, then the resulting drawing would appear substantially similar to the oblate form of the disc 30 in Fig. 3; but if the template were set in a horizontal plane, as in the full-line illustration of Fig. 6, then the resulting drawing would appear as a circle, but this circle could be of lesser or greater radius than that of the template, depending upon the radial setting of the point 25c, as by manipulation of joints 25a, 25b, for example.

The versatility of the instrument may be extended in the form of construction of the template means shown in Figs. 8 through 11, wherein provision is made for shifting the template axially, and for removing the template for substitution of other pattern forms, as will appear.

Figure 9:
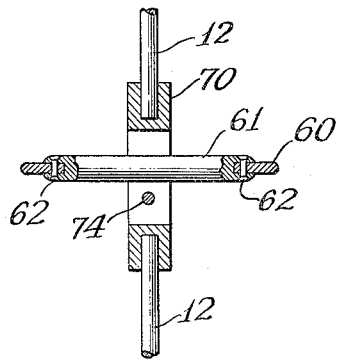
Fig. 9 is a vertical section looking toward lines 9—9 of Fig. 8.

Referring to Fig. 8, the template 60 is in the form of a ring, and the pivot bar 61 is slotted axially at both ends, as shown in Fig. 9 with the ring fitted into said ends and secured in position by means of rivets or pins 62. In other respects, the form of the trunnion or pivot block may be the same as that of block 20 heretofore described; however, the construction of Fig. 10 may also be employed, with additional advantage.

Figure 10:
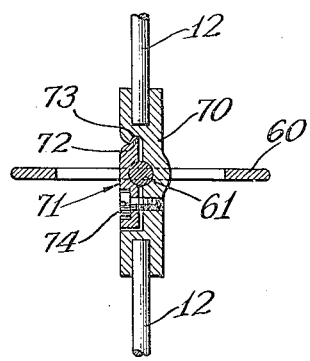
Fig. 10 is a vertical section through the modified template means of Fig. 8 showing the removable mounting means.

The block 70 of Fig. 10 has a central plate 71 provided with a tail 72 adapted to fit into an undercut 73 in the block, which secures one end of the plate, and a combination holding and tensioning screw 74 holds the plate in position and also serves, when pulled up tightly, to grab the pivot bar 61 and fix the template in a desired position of adjustment.

Whether the form of block 20 shown in Fig. 6, or that of Fig. 10 be used, it will be clear that loosening of the tensioning screws 20Y or 74, where template means 60, 61 is employed, will render it possible to shift the template in the direction of the axis of the pivot bar 61, thus disposing the template in positions of eccentricity with respect to the leg portion 12 carrying said block 20 or 70, which will result in corresponding alternations of the radial shifting of the movable or tracing leg 25. In addition, it will appear that the template 60 may also be rocked about this axis of shifting in the manner heretofore described for template 30, with corresponding additional components of radial variation in the movement of the movable tracing leg as the latter follows the edge of the template in rotation about leg 12, so that the range of curvatures is further extended.

In addition to steadying the instrument in use, the leg 50 has the further important function of affording a means for orienting the desired figure on the sheet. For example, if it is desired that a symmetrical figure, such as an ellipse, lie in a certain position on the drawing, the draftsman first determines the position of the axis, usually the major axis, of the desired figure, and thereupon he sets the two points 13 and 51; the resulting figure will then lie symmetrically about, i. e. on opposite sides of, this axis or line. In Fig. 1, the base line upon which points 13 and 51 are seen to rest, could be regarded as an alignment of the sort alluded to; and, in this instance, this line would be a major axis by reason of the position in which the template 30 is there shown. If the desired figure is not symmetrical, it may nevertheless be oriented in a selected position by appropriately placing the points 13 and 51 of the compass legs.

It is desirable that the pivot 41 fit frictionally in its seat in block 20 (e. g. Fig. 6), in order that the template will remain in whatever position of adjustment it is set until the set screw 20Y is tightened.

In the embodiments thus far described, the template or guide means has been of uniformly circular character; however, it will be apparent to those skilled in the art that the edge portion of the template, for instance the edge 31 in Fig. 5, may be made of undulating character according to some predetermined requirement, and this, in addition to the possible adjustment of the template heretofore described, will expand the range of the instrument still farther.

Figure 11:
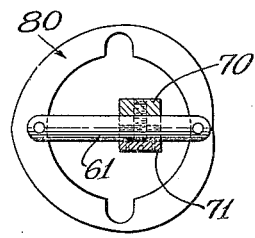
Fig. 11 is a top plan view of a modified shape of template for reproducing a predetermined pattern.

Instead of being circular, the template may be elliptical; the guiding periphery may have parabolic or hyperbolic components; or the template disc may be of some special shape, as for example, that of the heart-shaped guide 80 of Fig. 11, which would be utilized in reproducing a heart cam, particularly in cases where such a figure was repeatedly being drawn to different scales. Such special templates may be interchanged by simply removing the plate 71 of Fig. 10 and substituting the desired template.

For purposes of illustration, a preferred embodiment of the invention has been described in detail, but it is not intended that the form or mode of operation of the invention shall be confined to the precise details described excepting as may be expressly provided for in the appended claims.

What I claim as my invention is:

1. In a drawing instrument of the class described, template means comprising an annulus, a pivot member disposed across the opening in said annulus, and a journal member in two pieces, at least, said pieces being removably clamped together to embrace said pivot member and mount the template for rocking adjustment.

2. A drawing instrument comprising a relatively stationary leg, a yoke-shaped member having end portions of opposite arms of the yoke slidably engaging said leg so as to shift along the axis of said leg, spring means acting between an upper stop member on said leg and the adjacent yoke arm to urge the yoke toward the lower end of said leg, a scribing leg movable relative to said stationary leg, and parallel links pivotally joining points along the axis of said movable leg with points adjacent the ends of said yoke arms whereby to maintain said movable leg in parallelism with said stationary leg when the lower ends of said legs are on a substantially plane surface for drawing, a template on said stationary leg between the ends of said yoke arms, and a template roller on said movable leg engaged by the template and disposed on the latter leg in the region between the pivotal connections thereto of said links, and a third stabilizing leg carried by said stationary leg.

3. A compass-type ellipsograph and curve scriber comprising stationary and movable compass legs, a U-shaped member slidable on the stationary leg with the bight portion thereof moving approximately parallel to the axis of the stationary leg, spring means normally urging said U-shaped member from an upper end region toward a lower end region of the stationary leg, said movable leg being connected to said U-shaped member by means of parallel links pivotally attached to end regions of the U-shaped member and to points spaced along the axis of the movable leg, such that the latter tends to shift in parallelism with the stationary leg, said spring urging means causing the movable leg to be disposed in predetermined proximity to the stationary leg when the respective lower points of said legs are disposed on a substantially plane drawing surface, a template carried on the stationary leg between the ends of said U-shaped member, the edge region of said template being engaged by the movable leg under urgence of the spring means as aforesaid, said U-shaped member being rotatable about the stationary leg to cause the movable leg to follow said template, and scribe means carried at a lower end region of the movable leg.

4. In a drawing instrument, a stationary compass leg and a movable compass leg and means mounting the latter to move rotatably and radially relative to the former, and including a yoke carrier having the ends of its arms slidably embracing the first one of said legs so as to shift along the axis of said first leg and also to rotate about said axis, a pair of parallel links each having an end region pivotally connected to one of said yoke arm ends and an opposite end region pivotally connected to a point axially displaced from the other said opposite end region on the other one of said legs, such that the latter is constrained to move in parallelism toward and away from the first said leg, spring means acting on said yoke carrier to urge the latter slidable to a normally lowered position, whereby to yieldingly dispose said other leg close to the first leg, and a template carried on the first leg and having a following edge portion engaged by the other leg, as a result of the aforesaid action of said spring means, in any movement of the said other leg about the first leg, and means cooperating with said first leg for stabilizing the same in movements of the other leg thereabout.

ARNI ARNASON.

REFERENCES CITED

The following references are of record in the file of this patent:

UNITED STATES PATENTS

| Number | Name | Date |
|---|---|---|
| 646,329 | Tintanne | Mar. 27, 1900 |
| 1,055,303 | Elliott | Mar. 4, 1913 |
| 1,128,289 | Cirigliano | Feb. 16, 1915 |
| 1,168,546 | Odin | Jan. 18, 1916 |
| 1,391,530 | Diego | Sept. 20, 1921 |

FOREIGN PATENTS

| Number | Country | Date |
|---|---|---|
| 196,682 | Germany | Mar. 23, 1908 |
| 603,712 | Germany | Oct. 6, 1934 |